United States Patent
Park et al.

(10) Patent No.: US 10,112,368 B2
(45) Date of Patent: *Oct. 30, 2018

(54) FLEXIBLE METAL LAMINATE AND PREPARATION METHOD OF THE SAME

(71) Applicant: SHENGYI TECHNOLOGY CO., LTD., Dongguan, Guangdong (CN)

(72) Inventors: Si Young Park, Daejeon (KR); Soon Yong Park, Daejeon (KR); Young Seok Park, Daejeon (KR); Joo Yeon Seo, Daejeon (KR)

(73) Assignee: SHENGYI TECHNOLOGY CO., LTD., Dongguan, Guangdong (CN)

( * ) Notice: Subject to any disclaimer, the term of this patent is extended or adjusted under 35 U.S.C. 154(b) by 232 days.

This patent is subject to a terminal disclaimer.

(21) Appl. No.: 15/024,723

(22) PCT Filed: Sep. 4, 2015

(86) PCT No.: PCT/KR2015/009368
§ 371 (c)(1),
(2) Date: Mar. 24, 2016

(87) PCT Pub. No.: WO2016/052873
PCT Pub. Date: Apr. 7, 2016

(65) Prior Publication Data
US 2016/0375657 A1 Dec. 29, 2016

(30) Foreign Application Priority Data

Sep. 30, 2014 (KR) .................. 10-2014-0131866
Aug. 28, 2015 (KR) .................. 10-2015-0121657

(51) Int. Cl.
*B32B 15/08* (2006.01)
*B32B 15/20* (2006.01)
(Continued)

(52) U.S. Cl.
CPC .............. *B32B 15/08* (2013.01); *B32B 15/20* (2013.01); *B32B 27/08* (2013.01); *B32B 27/18* (2013.01);
(Continued)

(58) Field of Classification Search
CPC ....... B32B 15/08; B32B 15/20; B32B 27/281; B32B 2307/206; B32B 2307/204
See application file for complete search history.

(56) References Cited

U.S. PATENT DOCUMENTS

| 4,816,516 A | 3/1989 | Yamaya et al. |
| 7,026,032 B2 | 4/2006 | Lee et al. |
| 9,307,638 B2 | 4/2016 | Park et al. |
| 9,725,565 B2 * | 8/2017 | Park ........................ C08J 5/121 |

(Continued)

FOREIGN PATENT DOCUMENTS

| EP | 1 327 515 A1 | 7/2003 |
| EP | 2 886 589 A1 | 6/2015 |

(Continued)

OTHER PUBLICATIONS

International Search Report and Written Opinion issued in International Application No. PCT/KR2015/009368 dated Dec. 30, 2015, 12 pages.

(Continued)

*Primary Examiner* — Hai Vo
(74) *Attorney, Agent, or Firm* — Rothwell, Figg, Ernst & Manbeck, P.C.

(57) ABSTRACT

This disclosure relates to a flexible metal laminate including: a porous polyimide resin layer including 30 wt % to 95 wt % of a polyimide resin; and 5 to 70 wt % of a hollow fluorinated resin having a mean outer diameter of 0.1 μm to 10.0 μm.

17 Claims, 1 Drawing Sheet

(51) Int. Cl.
  *B32B 27/08* (2006.01)
  *B32B 27/18* (2006.01)
  *B32B 27/20* (2006.01)
  *B32B 27/28* (2006.01)
  *C08L 79/08* (2006.01)

(52) U.S. Cl.
  CPC ............ *B32B 27/20* (2013.01); *B32B 27/205* (2013.01); *B32B 27/281* (2013.01); *C08L 79/08* (2013.01); *B32B 2255/10* (2013.01); *B32B 2255/205* (2013.01); *B32B 2264/0242* (2013.01); *B32B 2264/0257* (2013.01); *B32B 2307/204* (2013.01); *B32B 2307/206* (2013.01); *B32B 2307/51* (2013.01); *B32B 2307/546* (2013.01); *B32B 2307/72* (2013.01); *B32B 2307/7246* (2013.01); *B32B 2457/08* (2013.01)

(56) References Cited

U.S. PATENT DOCUMENTS

| | | |
|---|---|---|
| 2003/0148112 A1 | 8/2003 | Kawashima et al. |
| 2005/0096429 A1 | 5/2005 | Lee et al. |
| 2015/0274903 A1 | 10/2015 | Park et al. |

FOREIGN PATENT DOCUMENTS

| | | |
|---|---|---|
| JP | 2003-213062 A | 7/2003 |
| JP | 2005-142572 A | 6/2005 |
| JP | 2005-146243 A | 6/2005 |
| JP | 2007-30501 A | 2/2007 |
| JP | 2007-131005 A | 5/2007 |
| JP | 2009-242711 A | 10/2009 |
| KR | 10-2002-0037286 A | 5/2002 |
| KR | 10-2007-0035056 A | 3/2007 |
| KR | 10-2010-0014368 A | 2/2010 |
| KR | 10-2011-0090825 A | 8/2011 |
| KR | 10-2012-0067574 A | 6/2012 |
| KR | 10-2013-0027442 A | 3/2013 |
| KR | 10-1315899 B1 | 10/2013 |
| KR | 10-1344006 B1 | 12/2013 |
| TW | 489317 | 6/2002 |
| TW | 201420333 A | 6/2014 |

OTHER PUBLICATIONS

Extended European Search Report issued for European Patent Application No. 15837125.2 dated May 29, 2017, 6 pages.

* cited by examiner

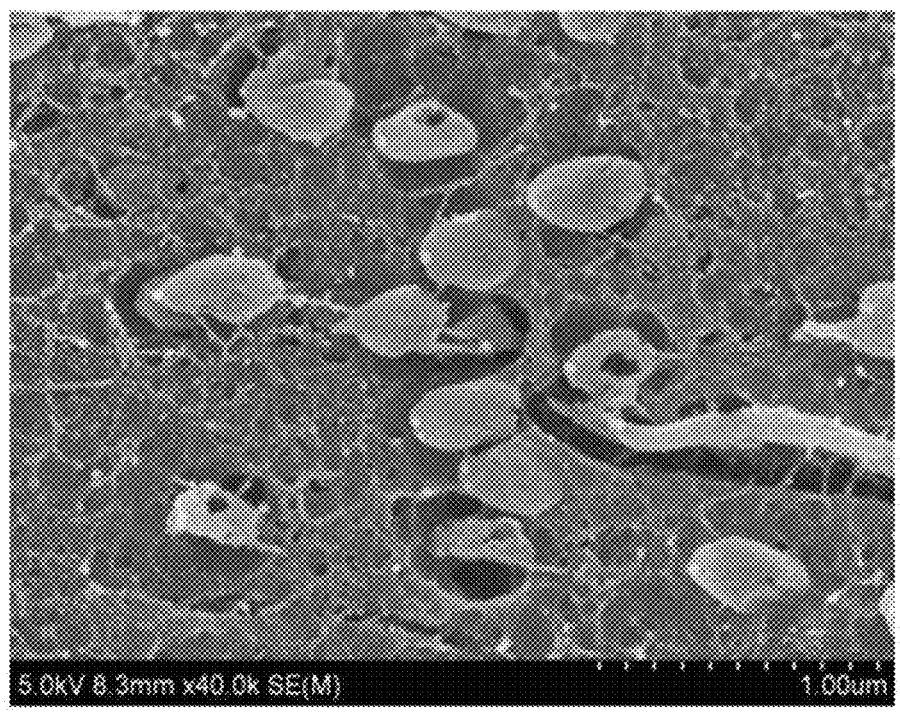

FLEXIBLE METAL LAMINATE AND PREPARATION METHOD OF THE SAME

CROSS-REFERENCE TO RELATED APPLICATIONS

This application is a 35 U.S.C. § 371 National Phase Entry Application from PCT/KR2015/009368, filed on Sep. 4, 2015, and designating the United States, which claims priority under 35 U.S.C. § 119 to Korean Patent Application No. 10-2014-0131866 filed Sep. 30, 2014 and Korean Patent Application No. 10-2015-0121657 filed Aug. 28, 2015, the entire contents of which are incorporated herein by reference.

FIELD OF THE INVENTION

The present invention relates to a flexible metal laminate and a method for preparing the same, and more specifically, to a flexible metal laminate that has low permittivity and a low moisture absorption rate, and yet has high elasticity, and a method for preparing the flexible metal laminate.

BACKGROUND OF THE INVENTION

Recently, with the tendencies of miniaturization and high speed of electronic devices and combination of various functions, signal transmission speed inside electronic devices or signal transmission speed outside of electronic devices is increasing. Thus, a printed circuit board using an insulator having lower permittivity and dielectric loss factor than the existing insulator is required.

As a reflection of such tendencies, recently, there has been an attempt to apply a liquid crystalline polymer (LCP), which is an insulator having lower permittivity and that is less influenced by moisture absorption than the existing polyimide, even in a flexible printed circuit board. However, even if the LCP is applied, permittivity (DK=2.9) of LCP is not significantly different from polyimide (Dk=3.2), and thus the degree of improvement according to the application is insignificant. Further, heat resistance of the LCP is so low so as to cause problems in a soldering process, and compatibility with a PCB manufacturing process using the existing polyimide is lowered in via hole processing using a laser.

Thus, as a solution thereto, there has been an attempt to lower permittivity of a polyimide that is used as an insulator of the existing flexible circuit board. For example, according to U.S. Pat. No. 4,816,516, a polyimide and a fluorinated polymer are mixed to make a molded product. However, this patent is not related to a product for an electronic device requiring low permittivity, but is related to a molded product, and practically uses a polyimide having a high coefficient of thermal expansion and a low glass transition temperature. In addition, a polyimide resin should be processed in the form of a thin film so as to be used in a printed circuit board, but there is no description for a copper clad laminate prepared in the form of a thin film in the above U.S. patent.

U.S. Pat. No. 7,026,032 discloses a method of lowering permittivity of a product that is prepared by dispersing a micro-powder of a fluorinated polymer in a polyimide. The above U.S. Patent describes that a micro-powder of a fluorinated polymer is distributed more in the outer surface compared to the internal core of the insulator. However, as described in the above U.S. patent, since the content of the fluorinated polymer is high in the outermost layer of the insulator, moisture permeation and absorption are lowered due to the fluorinated polymer of the outer surface, thus lowering the total moisture absorption rate, but problems that a flexible copper clad laminate consisting of the existing polyimide did not have may be generated. For example, the polyimide resin described in the above U.S. patent may have lowered adhesion to a coverlay or prepreg and lowered adhesion to an anisotropic conductive film (ACF), the coefficient of thermal expansion (CTE) of the polyimide resin described in the above U.S. patent is too large to be applied for a flexible copper clad laminate, and a fluorinated resin exists in an excessive amount on the surface of the polyimide resin, and thus a fluorinated resin may be melted at a temperature around 380° C. that is applied in a receiving process during a PCB manufacturing process, and there is a danger of delamination of a copper clad circuit from an insulator.

Accordingly, there is a need for development of a material that exhibits low permittivity and yet has a low coefficient of thermal expansion, high elasticity, and a low moisture absorption rate, so as to prepare a low-permittivity printed circuit board.

PRIOR ART

Patent Document (Patent Document 1) U.S. Pat. No. 4,816,516
(Patent Document 2) U.S. Pat. No. 7,026,032

DETAILED DESCRIPTION OF THE INVENTION

Technical Objectives

It is an object of the invention to provide a flexible metal laminate that has low permittivity and a low moisture absorption rate, and yet has high elasticity.

It is another object of the invention to provide a method for preparing a flexible metal laminate that has low permittivity and a low moisture absorption rate, and yet has high elasticity.

Technical Solutions

Provided herein is a flexible metal laminate including: a porous polyimide resin layer including 30 wt % to 95 wt % of a polyimide resin; and 5 wt % to 70 wt % of a hollow fluorinated resin having a mean outer diameter of 0.1 μm to 10.0 μm.

Also provided is a method for preparing a flexible metal laminate including the steps of: raising the temperature of a resin composition including 30 wt % to 95 wt % of a polyamic acid resin and 5 wt % to 70 wt % of fluorinated resin particles to 340° C. to 370° C. while varying a temperature rising speed at temperature ranges below and exceeding 280° C. to 320° C., and cooling the temperature-raised resin composition to form a porous polyimide resin layer; and depositing a metal thin film on at least one side of the porous polyimide resin layer.

Hereinafter, a flexible metal laminate according to specific embodiments of the invention will be explained in detail.

According to one embodiment of the invention, a flexible metal laminate including a porous polyimide resin layer including 30 wt % to 95 wt % of polyimide resin, and 5 wt % to 70 wt % of a hollow fluorinated resin having a mean outer diameter of 0.1 μm to 10.0 μm, is provided.

Previously, a method of adding a fluorinated polymer resin so as to decrease permittivity of a polymer resin such as a polyimide and the like that is applied to a flexible metal laminate was known. However, the coefficients of thermal expansion of representative fluorinated resins polytetrafluoroethylene (PTFE), a tetrafluoroethylene-hexafluoropropylene copolymer (FEP), and a perfluoroalkoxy (PFA) respectively amount to 135 ppm, 150 ppm, and 230 ppm, which are significantly higher compared to the coefficient of thermal expansion of a common polyimide of 10 ppm to 30 ppm, and since such fluorinated resin should be added in an amount of about 10 wt % to 60 wt % so as to sufficiently reduce permittivity of the polyimide, the total coefficient of thermal expansion inevitably increases.

On the other hand, since the flexible metal laminate of one embodiment includes a porous polyimide resin layer in which multiple hollow fluorinated resin particles having a mean outer diameter of 0.1 μm to 10.0 μm or 1.0 μm to 5.0 μm are distributed, high elasticity may be secured while significantly reducing permittivity compared to adding fluorinated resin of the prior art, and the coefficient of thermal expansion may be easily controlled to an optimized range for use as a flexible metal laminate.

The mean particle diameter of the hollow fluorinated resin particles may be obtained by measuring the longest diameter of each hollow fluorinated resin particle and calculating the mean value. For example, the longest diameter of each hollow fluorinated resin particle observed at a cross-section of the porous polyimide resin layer is measured, and the mean of the measured values is calculated and defined as the mean outer diameter.

The porous polyimide layer may have porosity as the hollow core part inside the hollow fluorinated resin particle forms an empty space. Such hollow fluorinated resin particles afford porosity to the porous polyimide resin layer, and thus low permittivity may be secured without significantly increasing the content of fluorinated resin in the porous polyimide resin layer, and a rapid increase in the coefficient of thermal expansion due to fluorinated resin may be prevented.

Specifically, the hollow fluorinated resin particle may include an outer wall including a fluorinated resin, and a hollow core part surrounded by the outer wall and having a maximum cross-sectional diameter of 0.05 μm to 9.5 μm, or 0.1 μm to 4.5 μm. Namely, due to the empty space of the hollow core part of the hollow fluorinated resin particle, the porous polyimide layer may become porous and thus have relatively low density, permittivity, and dielectric constant.

The porous polyimide resin layer may have density of 1.2 g/cm$^3$ to 1.9 g/cm$^3$, or 1.3 g/cm$^3$ to 1.5 g/cm$^3$.

Further, the volume ratio of the hollow core part of the hollow fluorinated resin in the porous polyimide resin layer may be 0.1 vol % to 5 vol %, 0.11 vol % to 1 vol %, or 0.13 vol % to 0.85 vol %.

The hollow fluorinated resin particles may be open hollow particles wherein parts of the outer walls of the particles are open or large pores are formed on parts of the outer walls, or closed hollow particles wherein the outer walls of the particles are filled with fluorinated resin particles.

The outer wall of the hollow fluorinated resin particles may be a porous wall including pores of a predetermined size, or a wall that does not include pores and completely surrounds the hollow core part.

The preparation process of the porous polyimide resin layer may include mixing a polyimide resin or a precursor thereof (for example, polyamic acid and the like) and a fluorinated resin, and heating the mixture to a high temperature, wherein as the polyimide resin or a precursor and fluorinated resin are bonded through a predetermined bonding force and thermally expanded, a hollow core part may be formed inside the fluorinated resin, and an outer wall including the fluorinated resin may be formed along the interface with the polyimide resin. Thereby, the finally prepared polyimide resin layer may have a porous property or shape due to the hollow core part of the hollow fluorinated resin particles.

Specifically, in the preparation process of the porous polyimide resin layer, by raising the temperature of a resin composition including a polyimide resin or a precursor thereof (for example, polyamic acid and the like) and the fluorinated resin particles to 340° C. to 370° C. while varying the temperature rising speed at temperature ranges below and exceeding 280° C. to 320° C., and then cooling, a porous polyimide resin layer including polyimide resin, and hollow fluorinated resin particles dispersed in the polyimide resin and having a mean outer diameter of 0.1 μm to 10.0 μm, may be provided.

More specifically, the above-explained porous polyimide resin layer may be prepared by coating the resin composition including a polyamic acid resin and fluorinated resin particles on a predetermined substrate, raising the temperature of the coated composition at a speed of 3° C./min to 10° C./min at a temperature range below 280° C. to 320° C., and raising the temperature to 340° C. to 370° C. at the speed of 0.2° C./min to 2° C./min at a temperature range exceeding 280° C. to 320° C., and then cooling to the temperature of 200° C. to 280° C. at the speed of 3° C./min to 10° C./min.

The above-explained porous polyimide resin layer may be prepared by coating the resin composition including a polyamic acid resin and fluorinated resin particles on a predetermined substrate, raising the temperature of the coated composition at a speed of 3° C./min to 10° C./min at a temperature range below 300° C. and raising it to 340° C. to 370° C. at a speed of 0.2° C./min to 2° C./min at a temperature range exceeding 300° C., and then cooling to the temperature of 230° C. to 270° C. at the speed of 4° C./min to 8° C./min.

As explained above, as the polyimide resin included in the porous polyimide resin layer has a bonding force with the porous polyimide resin beyond a certain level, an outer wall including the fluorinated resin may be formed along the interface with the polyimide resin, and a hollow core part may be formed inside the fluorinated resin.

Meanwhile, specific characteristics of the polyimide resin included in the porous polyimide resin layer are not limited, and a polyimide resin known to be used in a flexible metal laminated may be used without specific limitations.

For example, the polyimide resin may have weight average molecular weight of 1000 to 500,000, or 10,000 to 300,000. If the weight average molecular weight of the polyimide resin is too small, mechanical properties required for application as a flexible metal laminate and the like may not be sufficiently secured. If the weight average molecular weight of the polyimide resin is too large, elasticity or mechanical properties of the polyimide resin film of one embodiment may be degraded.

As used herein, weight average molecular weight means a weight average molecular weight with polystyrene conversion measured by GPC.

Specific examples of the polyimide resin may include a polyimide resin including a repeat unit of the following Chemical Formula 1.

[Chemical Formula 1]

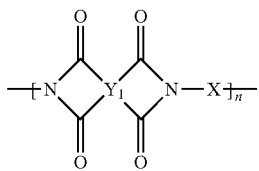

In Chemical Formula 1, $Y_1$ is a tetravalent aromatic organic functional group, X is a divalent aromatic organic functional group, and n is an integer of 1 to 300.

The $Y_1$ may include tetravalent functional groups selected from the group consisting of the following Chemical Formulae 21 to 27.

[Chemical Formula 21]

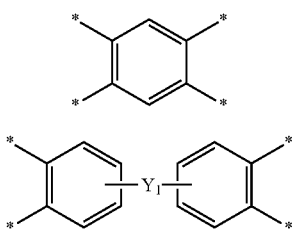

[Chemical Formula 22]

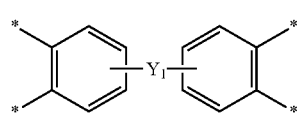

In Chemical Formula 22, $Y_1$ is a single bond, —O—, —CO—, —S—, —$SO_2$—, —$C(CH_3)_2$—, —$C(CF_3)_2$—, —CONH—, —COO—, —$(CH_2)_{n1}$—, —$O(CH_2)_{n2}O$—, or —$OCO(CH_2)_{n3}OCO$—, and n1, n2, and n3 are respectively an integer of 1 to 10.

[Chemical Formula 23]

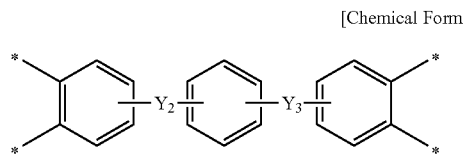

In Chemical Formula 23, $Y_2$ and $Y_3$ may be identical to or different from each other, and are independently a single bond, —O—, —CO—, —S—, —$SO_2$—, —$C(CH_3)_2$—, —$C(CF_3)_2$—, —CONH—, —COO—, —$(CH_2)_{n1}$—, —$O(CH_2)_{n2}O$—, or —$OCO(CH_2)_{n3}OCO$—, and n1, n2, and n3 are independently an integer of 1 to 10.

[Chemical Formula 24]

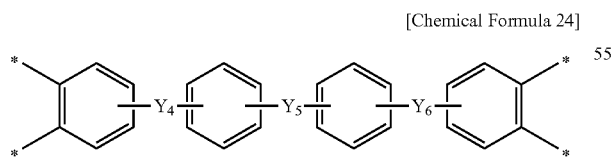

In Chemical Formula 24, $Y_4$, $Y_5$, and $Y_6$ may be identical to or different from each other, and are independently a single bond, —O—, —CO—, —S—, —$SO_2$—, —$C(CH_3)_2$—, —$C(CF_3)_2$—, —CONH—, —COO—, —$(CH_2)_{n1}$—, —$O(CH_2)_{n2}O$—, or —$OCO(CH_2)_{n3}OCO$—, and n1, n2, are n3 are independently an integer of 1 to 10.

[Chemical Formula 25]

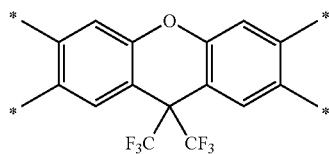

[Chemical Formula 26]

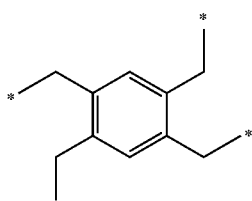

[Chemical Formula 27]

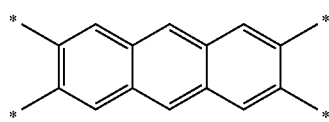

In Chemical Formulae 21 to 27, '*' denotes a bonding point.

Further, the $Y_1$ of Chemical Formula 1 may preferably be a tetravalent functional group selected from the group consisting of the following Chemical Formulae 28 to 30, so that the porous polyimide resin layer may have low permittivity and a low moisture absorption rate, and yet may have high elasticity and an optimized coefficient of thermal expansion.

A polyimide resin or precursor thereof including a repeat unit of Chemical Formula 1 including a tetravalent functional group selected from the group consisting of the following Chemical Formulae 28 to 30 has a bonding force with a fluorinated resin beyond a certain level, thus enabling easy formation of the above-explained hollow fluorinated resin particles.

The $Y_1$ may be identical to or different from each other in each repeat unit of Chemical Formula 1.

[Chemical Formula 28]

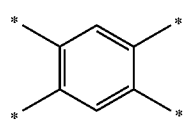

[Chemical Formula 29]

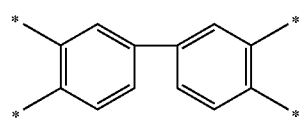

[Chemical Formula 30]

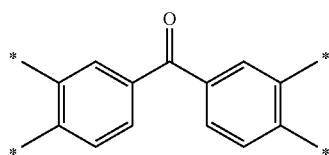

In Chemical Formulae 28 to 30, '*' denotes a bonding point.

Meanwhile, in Chemical Formula 1, X may be a divalent functional group selected from the group consisting of the following Chemical Formulae 31 to 34.

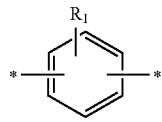
[Chemical Formula 31]

In Chemical Formula 31, $R_1$ may be hydrogen, —$CH_3$, —$CH_2CH_3$, —$CH_2CH_2CH_2CH_3$, —$CF_3$, —$CF_2CF_3$, —$CF_2CF_2CF_3$, or —$CF_2CF_2CF_2CF_3$.

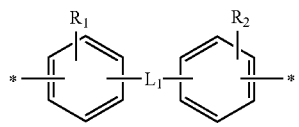
[Chemical Formula 32]

In Chemical Formula 32, $L_1$ is a single bond, —O—, —CO—, —S—, —$SO_2$—, —$C(CH_3)_2$—, —$C(CF_3)_2$—, —CONH—, —COO—, —$(CH_2)_{n1}$—, —$O(CH_2)_{n2}O$—, —$OCH_2$—$C(CH_3)_2$—$CH_2O$—, or —$OCO(CH_2)_{n3}OCO$—, n1, n2, and n3 are independently an integer of 1 to 10, and $R_1$ and $R_2$ may be identical to or different from each other, and are independently hydrogen, —$CH_3$, —$CH_2CH_3$, —$CH_2CH_2CH_2CH_3$, —$CF_3$, —$CF_2CF_3$, —$CF_2CF_2CF_3$, or —$CF_2CF_2CF_2CF_3$.

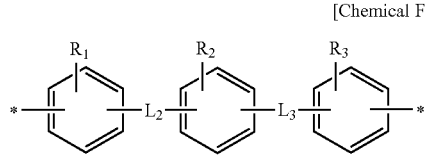
[Chemical Formula 33]

In Chemical Formula 33, $L_2$ and $L_3$ may be identical to or different from each other, and are independently a single bond, —O—, —CO—, —S—, —$SO_2$—, —$C(CH_3)_2$—, —$C(CF_3)_2$—, —CONH—, —COO—, —$(CH_2)_{n1}$—, —$O(CH_2)_{n2}O$—, —$OCH_2$—$C(CH_3)_2$—$CH_2O$—, or —$OCO(CH_2)_{n3}OCO$—, n1, n2, and n3 are independently an integer of 1 to 10, and $R_1$, $R_2$, and $R_3$ may be identical to or different from each other, and are independently hydrogen, —$CH_3$, —$CH_2CH_3$, —$CH_2CH_2CH_2CH_3$, —$CF_3$, —$CF_2CF_3$, —$CF_2CF_2CF_3$, or —$CF_2CF_2CF_2CF_3$.

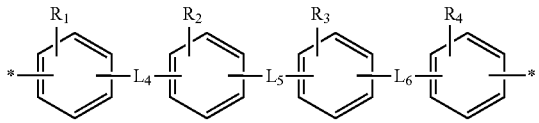
[Chemical Formula 34]

In Chemical Formula 34, $L_4$, $L_5$, and $L_6$ may be identical to or different from each other, and are independently a single bond, —O—, —CO—, —S—, —$SO_2$—, —$C(CH_3)_2$—, —$C(CF_3)_2$—, —CONH—, —COO—, —$(CH_2)_{n1}$—, —$O(CH_2)_{n2}O$—, —$OCH_2$—$C(CH_3)_2$—$CH_2O$—, or —$OCO(CH_2)_{n3}OCO$—, n1, n2, and n3 are independently an integer of 1 to 10, and $R_1$, $R_2$, $R_3$, and $R_4$ may be identical to or different from each other, and are independently hydrogen, —$CH_3$, —$CH_2CH_3$, —$CH_2CH_2CH_2CH_3$, —$CF_3$, —$CF_2CF_3$, —$CF_2CF_2CF_3$, or —$CF_2CF_2CF_2CF_3$.

Particularly, in case X of Chemical Formula 1 is a divalent functional group of the following Chemical Formula 35, the porous polyimide resin layer may have lower permittivity and a low moisture absorption rate, and may secure high elasticity and an optimized coefficient of thermal expansion. A polyimide resin or a precursor thereof including a repeat unit of Chemical Formula 1 including a divalent functional group of the following Chemical Formula 35 may have a bonding force with a fluorinated resin beyond a certain level, thus enabling easy formation of the above-explained hollow fluorinated resin particles.

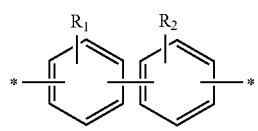
[Chemical Formula 35]

In Chemical Formula 35, $R_1$ and $R_2$ may be identical to or different from each other, and are independently —$CH_3$, —$CH_2CH_3$, —$CH_2CH_2CH_2CH_3$, —$CF_3$, —$CF_2CF_3$, —$CF_2CF_2CF_3$, or —$CF_2CF_2CF_2CF_3$.

Meanwhile, the porous polyimide resin layer may include 30 wt % to 95 wt % or 60 wt % to 90 wt % of a polyimide resin including a repeat unit of Chemical Formula 1, and a remaining amount of hollow fluorinated resin particles. If the content of the hollow fluorinated resin particles is too low, the finally prepared porous polyimide resin layer may not secure sufficiently low permittivity or moisture absorption rate. If the content of the hollow fluorinated resin particles is too high, mechanical properties of the flexible metal laminate may be degraded and thus it may be easily torn or broken, and a coefficient of thermal expansion of the porous polyimide resin layer included in the flexible metal laminate may largely increase.

Meanwhile, the porous polyimide resin layer may have a thickness of 0.1 μm to 100 μm, or 1 μm to 50 μm.

The fluorinated resin particles may include at least one selected from the group consisting of polytetrafluoroethylene (PTFE), a tetrafluoroethylene-perfluoroalkylvinylether copolymer (PFA), a tetrafluoroethylene-hexafluoropropylene copolymer (FEP), an ethylene-tetrafluoroethylene copolymer resin (ETFE), a tetrafluoroethylene-chlorotrifluoroethylene copolymer (TFE/CTFE) and an ethylene-chlorotrifluoroethylene resin (ECTFE).

The porous polyimide resin layer may have a dielectric constant (Dk) of 2.7 or less, 2.2 to 2.7, or 2.3 to 2.6 in a dry state at 5 GHz. While a common polyimide resin generally has a dielectric constant of 3.0 or more in a dry state at 5 GHz, the above porous polyimide resin layer may have a relatively low dielectric constant.

The porous polyimide resin layer may have a coefficient of thermal expansion of 1 ppm to 28 ppm at 100° C. to 200° C. Since the coefficient of thermal expansion of a copper foil, which is a metal foil commonly used in a flexible metal laminate, is about 18 ppm, the coefficient of thermal expansion of the polyimide resin film of one embodiment should be within the above explained range, so that bending generated due to a difference in coefficient of thermal expansion with a metal foil may be minimized, and stretch difference with other materials constituting a printed circuit board may be minimized.

The flexible metal laminate of one embodiment may include the porous polyimide resin layer and a metal thin film, and the metal thin film may include at least one metal selected from the group consisting of copper, iron, nickel, titanium, aluminum, silver, gold, and alloys thereof.

Further, the metal thin film may be deposited on at least one side of the porous polyimide resin layer.

Specifically, the flexible metal laminate may include one metal thin film, or the flexible metal laminate may include two metal thin films, and in this case, the porous polyimide resin layer may be positioned between the two opposing metal thin films.

The ten point average roughness (Rz) of the surface of the metal thin film may be 0.5 μm to 2.5 μm. If the ten point average roughness of the metal thin film surface is too small, adhesion with the polymer resin layer may be lowered, and if the ten point average roughness of the metal thin film surface is too large, surface roughness may increase and transmission loss may increase at a high frequency.

The metal thin film may have a thickness of 0.1 μm to 50 μm.

The above-explained flexible metal laminate may further include a polyimide resin layer formed on at least one side of the porous polyimide resin layer.

Specifically, the flexible metal laminate may further include second and third polyimide resin films or polyimide resin layers bonded to both sides of the porous polyimide resin layer. The second and third polyimide resin films may respectively have a composition identical to or different from that of the above-explained polyimide resin.

Further, the second and third polyimide resin films may have a thickness identical to or different from that of the above-explained polyimide resin film, and may have a thickness of 0.1 μm to 100 μm, or 1 μm to 50 μm.

Meanwhile, according to another embodiment of the invention, a method for preparing a flexible metal laminate including the steps of: raising the temperature of a resin composition including 30 wt % to 95 wt % of a polyamic acid resin and 5 wt % to 70 wt % of fluorinated resin particles to 340° C. to 370° C. while varying a temperature rising speed at temperature ranges below and exceeding 280° C. to 320° C., and cooling the temperature-raised resin composition, to form a porous polyimide resin layer; and depositing a metal thin film on at least one side of the porous polyimide resin layer, is provided.

In the preparation process of the porous polyimide resin layer, a porous polyimide resin layer including a polyimide resin and hollow fluorinated resin particles dispersed in the polyimide resin and having a mean outer diameter of 0.1 μm to 10.0 μm may be provided by raising the temperature of a resin composition including the polyimide resin or a precursor thereof (for example, polyamic acid and the like) and fluorinated resin particles to 340° C. to 370° C. while varying the temperature rising speed at temperature ranges below and exceeding 280° C. to 320° C., and then cooling it.

The step of forming the porous polyimide resin layer may further include cooling the temperature-raised resin composition to the temperature of 200° C. to 280° C.

The step of forming the porous polyimide resin layer may further include cooling the temperature-raised resin composition to the temperature of 200° C. to 280° C. at the speed of 3° C./min to 10° C./min.

More specifically, the above-explained porous polyimide resin layer may be prepared by coating a composition including polyamic acid and fluorinated resin particles on a predetermined substrate, raising the temperature of the coated resin composition at the speed of 3° C./min to 10° C./min at a temperature range below 280° C. to 320° C., and raising the temperature to 340° C. to 370° C. at the speed of 0.2° C./min to 2° C./min at a temperature range exceeding 280° C. to 320° C., and then cooling to the temperature of 200° C. to 280° C. at the speed of 3° C./min to 10° C./min.

Namely, the step of forming the porous polyimide resin layer may include the steps of firstly raising the temperature of the resin composition at the speed of 3° C./min to 10° C./min at a temperature range below 280° C. to 320° C.; secondly raising the temperature to 340° C. to 370° C. at the speed of 0.2° C./min to 2° C./min at a temperature range exceeding 280° C. to 320° C.; and cooling the temperature-raised resin composition to the temperature of 200° C. to 280° C. at the speed of 3° C./min to 10° C./min.

The above-explained porous polyimide resin layer may be prepared by coating a resin composition including polyamic acid and fluorinated resin particles on a predetermined substrate, raising the temperature of the coated composition at the speed of 3° C./min to 10° C./min at a temperature range below 300° C., and raising the temperature to 340° C. to 370° C. at the speed of 0.2° C./min to 2° C./min at a temperature range exceeding 300° C., and then cooling to the temperature of 230° C. to 270° C. at the speed of 4° C./min to 8° C./min.

That is, the step of forming the porous polyimide resin layer may include: firstly raising the temperature of the resin composition at the speed of 3° C./min to 10° C./min at a temperature range below 300° C.; secondly raising the temperature of the firstly temperature-raised resin composition to 340° C. to 370° C. at the speed of 0.2° C./min to 2° C./min at a temperature range exceeding 300° C.; and cooling the secondly temperature-raised resin composition to the temperature of 230° C. to 270° C. at the speed of 4° C./min to 8° C./min.

In the process of raising the temperature of the resin composition including 30 wt % to 95 wt % of polyamic acid resin and 5 wt % to 70 wt % of fluorinated resin particles, if temperature rising speed at a temperature range below 280° C. to 320° C. or below 300° C. is too high, foam may be generated in the porous polyimide resin layer, or delamination of the layer included in the flexible metal laminate may be generated, and the coefficient of thermal expansion of the porous polyimide resin layer may significantly increase.

In the process of raising the temperature of the resin composition including 30 wt % to 95 wt % of polyamic acid resin and 5 wt % to 70 wt % of fluorinated resin particles, if temperature rising speed at a temperature range exceeding 280° C. to 320° C. or exceeding 300° C. is too low, pores may not be easily formed inside the hollow fluorinated resin particles, and thus it may be difficult to secure sufficient porosity of the porous polyimide resin layer, and the density or permittivity of the polyimide resin layer may not be sufficiently lowered.

Further, in the process of raising the temperature of the resin composition including 30 wt % to 95 wt % of polyamic acid resin and 5 wt % to 70 wt % of fluorinated resin particles, if temperature rising speed at a temperature range exceeding 280° C. to 320° C. or exceeding 300° C. is too high, foam may be generated in the porous polyimide resin layer, or it may be difficult for the porous polyimide resin layer to strongly bond or adhere to another thin film or layer of the flexible metal laminate, for example, a metal thin film and the like.

Meanwhile, in the process of cooling the resin composition, of which temperature has been raised to the range of 340° C. to 370° C., to the temperature of 200° C. to 280° C., if the cooling speed is too low, pores may not be easily formed inside the hollow fluorinated resin particles, and pores may be generated between the polyimide resin and the outer surface of the hollow fluorinated particles in the porous polyimide resin layer.

Further, in the process of cooling the resin composition, of which temperature has been raised to the range of 340° C. to 370° C., to the temperature of 200° C. to 280° C., if the cooling speed is too high, it may be difficult to sufficiently secure cooling efficiency, and pores may not be easily formed inside the hollow fluorinated resin particles.

As explained above, as the polyimide resin included in the porous polyimide resin layer has a bonding force with fluorinated resin beyond a certain level, an outer wall including fluorinated resin may be formed along the interface with the polyimide resin, and a core part may be formed inside the fluorinated resin.

The porous polyimide layer may have porosity as the hollow core part inside the hollow fluorinated resin particles forms an empty space. Specifically, the hollow fluorinated resin particles may include an outer wall including the fluorinated resin; and a hollow core part surrounded by the outer wall and having a maximum cross-sectional diameter of 0.05 μm to 9.5 μm, or 0.1 μm to 4.5 μm.

The porous polyimide resin layer may have a density of 1.2 g/cm$^3$ to 1.9 g/cm$^3$, or 1.3 g/cm$^3$ to 1.5 g/cm$^3$.

The volume ratio of the hollow core part of the hollow fluorinated resin in the porous polyimide resin layer may be 0.1 vol % to 5 vol %, 0.11 vol % to 1 vol %, or 0.13 vol % to 0.85 vol %.

Since the flexible metal laminate of one embodiment includes a porous polyimide resin layer in which multiple hollow fluorinated resin particles having a mean outer diameter of 0.1 μm to 10.0 μm, or 1.0 μm to 5.0 μm are distributed, permittivity may be significantly lowered and yet high elasticity may be secured, and the coefficient of thermal expansion may be easily controlled to a range optimized for use as a flexible metal laminate.

The details of the polyamic acid resin and the fluorinated resin particles include those explained above with regard to the flexible metal laminate of one embodiment. In addition, the details of the polyimide resin prepared from the polyamic acid resin include those explained above with regard to the flexible metal laminate.

The resin composition including 30 wt % to 95 wt % of a polyamic acid resin, and 5 wt % to 70 wt % of fluorinated resin particles, may further include a dispersant, and specific examples of the dispersant may include at least one selected from the group consisting of a polyester polymer, polyether-modified polydimethylsiloxane, and a polyester/polyamine polymer.

Previously, a method of using a fluorinated dispersant or a fluorinated surfactant so as to disperse fluorinated resin in polyamic acid or polyimide was known. However, although permittivity of the prepared polymer resin layer may be lowered to a certain degree according to the method of the prior art, the coefficient of thermal expansion of the prepared polymer resin layer may significantly increase due to the use of the fluorinated dispersant or fluorinated surfactant. To the contrary, as the resin composition used for preparing a porous polyimide resin layer includes a dispersant, the porous polyimide resin layer may have low permittivity, and yet may not have an excessively high coefficient of thermal expansion, and melting of the fluorinated resin included in the polyimide resin may be prevented in the preparation process of a metal laminate or a printed circuit board.

The resin composition may include 0.1 to 25 parts by weight, or 0.5 to 10 parts by weight of the dispersant, based on 100 parts by weight of the total fluorinated resin particles.

Meanwhile, the step of forming a porous polyimide resin layer may further include coating the resin composition on a substrate to a thickness of 0.1 μm to 200 μm, before the temperature raising.

Further, the step of depositing a metal thin film on at least one side of the porous polyimide resin layer may include applying a pressure of 500 Kgf to 3000 Kgf at a temperature of 250° C. to 450° C., so as to deposit a metal thin film including at least one metal selected from the group consisting of copper, iron, nickel, titanium, aluminum, silver, gold, and alloys thereof on at least one side of the porous polyimide resin layer.

Advantageous Effect of the Invention

According to the present invention, a flexible metal laminate that may have low permittivity and a low moisture absorption rate, and yet secure high elasticity and optimized coefficient of thermal expansion, and a method for preparing the flexible metal laminate, are provided.

Accordingly, the present invention, as a solution to an increase in data loss rate caused by a recent increase in data transmission speed of devices such as a notebook, a computer, a mobile phone, and the like, thickening of a printed circuit board, and a narrow width of a circuit in a printed circuit board, provides a low-permittivity polyimide resin film that has the properties of the existing polyimide insulator, such as high heat resistance, chemical resistance, dimensional stability, and the like.

Also, a low-permittivity copper clad laminate using the low-permittivity polyimide is provided. Thus, as a printed circuit board may be made thinner while matching impedance, portable electric devices may be made thinner, and the line width of a printed circuit board may be broadened, and thus a fraction of defects of a PCB manufacturing company may be significantly reduced, thus largely contributing to manufacture cost reduction.

BRIEF DESCRIPTION OF THE DRAWINGS

FIG. 1 shows a cross-sectional SEM photograph of the polyimide resin of Example 1.

DETAILED DESCRIPTION OF THE EMBODIMENTS

Specific embodiments of the invention will be explained in detail in the following examples. However, these examples are only to illustrate specific embodiments of the invention, and the scope of the invention is not limited thereto.

Preparation Example: Preparation of a Polyamic Acid Solution

Preparation Example 1: Preparation of a Polyamic Acid Solution Including Fluorinated Resin (P1)

Nitrogen was charged into a 1 L polyethylene (PE) bottle, 765 g of dimethylacetamide (DMAc), 219 g of polytetrafluoroethylene (PTFE) micro-powder (particle size: about 1.0 μm to 5.0 μm), and 765 g of beads having a diameter of 2 mm were introduced thereto, and the mixture was stirred in a ball milling apparatus.

Into a 500 mL round bottom flask, 16 g of a solution in which the PTFE micro-powder is dispersed, 107 g of dimethylacetamide, 13 g of pyromellitic dianhydride, and 20 g of 2,2'-bis(trifluoromethyl)-4,4'-diaminobiphenyl were introduced, and reacted while stirring using a stirrer while flowing nitrogen at 50° C. for 10 h, to obtain a polyamic acid solution (P1) having viscosity of about 25,000 cps.

Preparation Example 2: Preparation of a Polyamic Acid Solution Including Fluorinated Resin (P2)

Nitrogen was charged into a 1 L polyethylene (PE) bottle, 765 g of dimethylacetamide (DMAc), 219 g of polytetrafluoroethylene (PTFE) micro-powder (particle size: about 1.0 μm to 5.0 μm) and 765 g of beads having a diameter of 2 mm were introduced and the mixture was stirred in a ball milling apparatus.

Into a 500 mL round bottom flask, 73 g of a solution in which the PTFE micro-powder is dispersed, 115 g of dimethylacetamide, 11.609 g of pyromellitic dianhydride, and 17.391 g of 2,2'-bis(trifluoromethyl)-4,4'-diaminobiphenyl were introduced, and reacted while stirring using a stirrer while flowing nitrogen at 50° C. for 10 h, to obtain a polyamic acid solution (P2) having viscosity of about 100, 000 cps.

Preparation Example 3: Preparation of a Polyamic Acid Solution Including Fluorinated Resin (P3)

Into a 500 mL round bottom flask, 107 g of dimethylacetamide, 13 g of pyromellitic dianhydride, and 20 g of 2,2'-bis(trifluoromethyl)-4,4'-diaminobiphenyl were introduced, and reacted while stirring using a stirrer while flowing nitrogen at 50° C. for 10 h, to obtain a polyamic acid solution (P3) having viscosity of about 25,000 cps.

Examples 1 and 2 and Comparative Examples 1 and 2: Preparation of a Polyimide Resin Film for a Flexible Metal Laminate and a Flexible Metal Laminate Examples 1 and 2

(1) Preparation of Polyimide Resin Film

The polyamic acid solutions respectively prepared in the Preparation Examples 1 and 2 were coated on the matte side of a copper foil (thickness: 12 μm) to the final thickness of 25 μm, and then dried at 80° C. for 10 min.

The temperature of the dried product was raised from room temperature at the speed of 5° C./min at a temperature range below 300° C. and at the speed of 1° C./min at a temperature range greater than 300° C. to 350° C., and then it was cooled from 350° C. to 250° C. at the speed of 5° C./min to complete curing. After the curing was completed, the copper foil was etched to prepare a polyimide resin film with a thickness of 25 μm.

(2) Preparation of a Flexible Metal Laminate

To each polyimide resin film obtained in Example 1 and Example 2 and a copper foil with a thickness of 12 μm, 1700 Kgf of pressure was applied at 380° C. to laminate them, thus preparing a metal laminate.

Comparative Example 1

(1) Preparation of a Polyimide Resin Film

A polyimide resin film with a thickness of 25 μm was prepared by the same method as Example 1, except that the polyamic acid solution prepared in Preparation Example 3 was used instead of the polyamic acid solution prepared in Preparation Example 1.

(2) Preparation of a Flexible Metal Laminate

To the above obtained polyimide resin film and a copper foil with a thickness of 12 μm, 1700 Kgf of pressure was applied at 380° C. to laminate them, thus preparing a metal laminate.

Comparative Example 2

(1) Preparation of a Polyimide Resin Film

The polyamic acid solution of Preparation Example 2 was coated on the matte side of a copper foil (thickness: 12 μm) to a final thickness of 25 μm, and then dried at 80° C. for 10 min. The temperature of the dried product was raised from room temperature in a nitrogen oven, and cured at 350° C. for 30 min.

After the curing was completed, the copper foil was etched to prepare a polyimide resin film with a thickness of 25 μm.

(2) Preparation of a Flexible Metal Laminate

To the above obtained polyimide resin film and a copper foil with a thickness of 12 μm, 1700 Kgf of pressure was applied at 380° C. to laminate them, thus preparing a metal laminate.

EXPERIMENTAL EXAMPLES

1. Experimental Example 1: Observation of the Cross-Section of a Flexible Metal Laminate The cross-section of the copper clad laminate obtained in Example 1 was confirmed through a SEM photograph. As shown in FIG. 1, it was confirmed that micropores having a diameter of 0.05 μm to 20 μm are distributed in the polyimide resin layer obtained in Example 1.

2. Experimental Example 2: Measurement of the Properties of a Flexible Metal Laminate For the copper clad laminates obtained in the examples and comparative examples, dielectric constant, CTE, and absorption rate were measured and the results are shown in the following Table 1.

(1) Measurement Method of Dielectric Constant

The polyimide resin films obtained in the examples and comparative examples were dried at 150° C. for 30 min, and the dielectric constant of each polyimide resin film was measured by an SPDR (split post dielectric resonance) method, under conditions of 25° C. and 50% RH, using an Agilent E5071B ENA device, using a resonator.

(2) Measurement Method of Coefficient of Linear Thermal Expansion (CTE)

The coefficient of linear thermal expansion of each polyimide resin film obtained in the examples and comparative examples was measured using TMA/SDTA 840 apparatus of Mettler Company under a measuring condition of 100° C. to 200° C., according to the standard of IPC TM-650 2.4.24.3.

(3) Measurement Method of Absorption Rate

The absorption rate of each polyimide resin films obtained in the examples and comparative examples was calculated according to the standard of IPC TM-650 2.6.2C, by immersing the films in distilled water at 23° C. for 24 h, and measuring the masses of the objects before and after the immersion.

TABLE 1

Measurement results of Experimental Example 2

| | Porous polyimide resin layer | | Measurement result of Experimental Example 2 | | | |
|---|---|---|---|---|---|---|
| | Inner diameter of the hollow core part of fluorinated resin particles (μm) | Mean outer diameter of hollow fluorinated resin particles (μm) | Density (g/cm³) | Dielectric constant (Dk) @ 5 GHz | CTE (ppm) | bsorption rate (%) |
| Example 1 | about 0.5 to 2 | about 1 to 3 | 1.30 | 2.6 | 12 | 1.5 |
| Example 2 | about 0.5 to 2 | about 1 to 4 | 1.40 | 2.4 | 22 | 1.1 |
| Comparative Example 1 | — | — | 1.27 | 2.9 | 9 | 1.7 |
| Comparative Example 2 | — | — | 1.5 | 2.6 | 23 | 1.1 |

As shown in the Table 1, it was confirmed that hollow fluorinated resin particles having a mean outer diameter of about 1 μm to 4 μm, or 1 μm to 3 μm are distributed in the hollow polyimide resin layers obtained in Examples 1 and 2, and that a hollow core part with a diameter of about 0.5 μm to 2 μm is located inside the hollow fluorinated particles. It was also confirmed that the density of the polyimide resin layer is 1.30 g/cm³ to 1.40 g/cm³. Further, it was confirmed that the porous polyimide resin layers prepared in Examples 1 and 2 have low dielectric constants of 2.6 or less and low absorption rates of 1.5% or less, and yet have coefficients of linear expansion of 12 to 22 ppm.

To the contrary, it was confirmed that hollow fluorinated resin particles are not distributed in the polyimide resin layers of Comparative Examples 1 and 2, where Comparative Example 1 has a relatively high dielectric constant (2.9), a low coefficient of linear thermal expansion, and a high absorption rate, and Comparative Example 2 has relatively high density and a relatively high dielectric constant compared to Example 2 having identical PTFE content.

What is claimed is:

1. A flexible metal laminate comprising a porous polyimide resin layer, comprising:
   30 wt % to 95 wt % of a polyimide resin; and
   5 wt % to 70 wt % of hollow fluorinated resin particles having a mean outer diameter of 0.1 μm to 10.0 μm;
   wherein the flexible metal laminate comprises a metal film deposited on at least one side of the porous polyimide resin layer comprising at least one metal selected from the group consisting of copper, iron, nickel, titanium, aluminum, silver, gold, and alloys thereof, and
   wherein the hollow fluorinated resin particles comprise an outer wall including a fluorinated resin, and a hollow core part surrounded by the outer wall and having a maximum cross-sectional diameter of 0.05 μm to 9.5 μm.

2. The flexible metal laminate according to claim 1, wherein the volume ratio of the hollow core part of the hollow fluorinated resin in the porous polyimide resin layer is 0.1 vol % to 5 vol %.

3. The flexible metal laminate according to claim 1, wherein the hollow fluorinated resin particle is an open hollow particle or a closed hollow particle.

4. The flexible metal laminate according to claim 1, wherein the porous polyimide resin layer has a density of 1.2 g/cm³ to 1.9 g/cm³.

5. The flexible metal laminate according to claim 1, wherein the polyimide resin comprises a repeat unit of the following Chemical Formula 1:

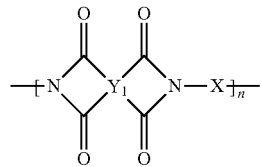

[Chemical Formula 1]

wherein, in Chemical Formula 1, n is n integer of 1 to 300,

Y1 is a tetravalent functional group selected from the group consisting of the following Chemical Formulae 28 to 30, and X is a divalent functional group of the following Chemical Formula 35,

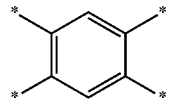

[Chemical Formula 28]

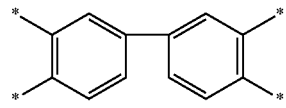

[Chemical Formula 29]

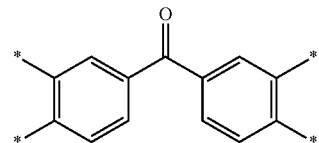

[Chemical Formula 30]

wherein, in Chemical Formulae 28 to 30, '*' denotes a bonding point,

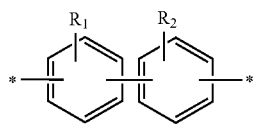

[Chemical Formula 35]

wherein, in Chemical Formula 35, R1 and R2 may identical to or different from each other, and are independently —CH3, —CH2CH3, —CH2CH2CH2CH3, —CF3, —CF2CF3, —CF2CF2CF3, or —CF2CF2CF2CF3.

6. The flexible metal laminate according to claim 1, wherein the porous polyimide resin layer has a thickness of 0.1 μm to 200 μm.

7. The flexible metal laminate according to claim 1, wherein the fluorinated resin particle includes at least one compound selected from the group consisting of polytetrafluoroethylene (PTFE), a tetrafluoroethylene-perfluoroalkylvinylether copolymer (PFA), a tetrafluoroethylene-hexafluoropropylene copolymer (FEP), an ethylene-tetrafluoroethylene copolymer resin (ETFE), a tetrafluoroethylene-chlorotrifluoroethylene copolymer (TFE/CTFE), and an ethylene-chlorotrifluoroethylene resin (ECTFE).

8. The flexible metal laminate according to claim 1, wherein the porous polyimide resin layer has a dielectric constant of 2.7 or less at 5 GHz.

9. The flexible metal laminate according to claim 1, wherein the flexible metal laminate comprises one or more porous polyimide resin layers.

10. The flexible metal laminate according to claim 1, further comprising one or more thermoplastic polyimide resin layers having a thickness of 0.1 μm to 200 μm.

11. A method for preparing the flexible metal laminate of claim 1 comprising the steps of: raising the temperature of a polyimide resin precursor composition comprising 30 wt % to 95 wt % of a polyamic acid resin and 5 wt % to 70 wt % of fluorinated resin particles to 340° C. to 370° C. while varying a temperature rising speed at temperature ranges below and exceeding 280° C. to 320° C., and cooling the temperature-raised resin composition to form a porous polyimide resin layer; and depositing a metal film comprising at least one metal selected from the group consisting of copper, iron, nickel, titanium, aluminum, silver, gold, and alloys thereof on at least one side of the porous polyimide resin layer.

12. The method according to claim 11, wherein the temperature-raising of a polyimide resin precursor composition comprising 30 wt % to 95 wt % of a polyamic acid resin and wt % 5 to 70 wt % of fluorinated resin particles to 340° C. to 370° C. while varying a temperature rising speed at temperature ranges below and exceeding 280° C. to 320° C. comprises:
firstly raising the temperature of the resin composition at the speed of 3° C./min to 10° C./min at a temperature range below 280° C. to 320° C.; and
secondly raising the temperature of the firstly temperature-raised resin composition to 340° C. to 370° C. at the speed of 0.2° C./min to 2° C./min at a temperature range exceeding 280° C. to 320° C.

13. The method according to claim 11, wherein the step of forming the porous polyimide resin layer further comprises cooling the temperature-raised resin composition to the temperature of 200° C. to 280° C.

14. The method according to claim 13, wherein the step of forming the porous polyimide resin layer comprises cooling the temperature-raised resin composition to the temperature of 200° C. to 280° C. at the speed of 3° C./min to 10° C./min.

15. The method according to claim 11, wherein the step of forming the porous polyimide resin layer comprises:
firstly raising the temperature of the resin composition at the speed of 3° C./min to 10° C./min at a temperature range below 300° C.;
secondly raising the temperature of the firstly temperature-raised resin composition to 340° C. to 370° C. at the speed of 0.2° C./min to 2° C./min at a temperature range exceeding 300° C.; and
cooling the secondly temperature-raised resin composition to the temperature of 230° C. to 270° C. at the speed of 4° C./min to 8° C./min.

16. The method according to claim 11, wherein the step of forming the porous polyimide resin layer further comprises coating the resin composition on a substrate to a thickness of 0.1 μm to 200 μm before the temperature raising.

17. The method according to claim 11, wherein the step of depositing the metal film on at least one side of the porous polyimide resin layer comprises:
applying a pressure of 500 Kgf to 3000 Kgf at the temperature of 250° C. to 450° C., so as to deposit the metal film on at least one side of the porous polyimide resin layer.

* * * * *